(12) United States Patent
Jang et al.

(10) Patent No.: US 12,438,164 B2
(45) Date of Patent: Oct. 7, 2025

(54) FUEL CELL SYSTEM

(71) Applicant: LG ELECTRONICS INC., Seoul (KR)

(72) Inventors: Heejoong Jang, Seoul (KR); Hyoungsuk Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 436 days.

(21) Appl. No.: 17/940,548

(22) Filed: Sep. 8, 2022

(65) Prior Publication Data

US 2023/0072408 A1 Mar. 9, 2023

(30) Foreign Application Priority Data

Sep. 9, 2021 (KR) .................. 10-2021-0120160

(51) Int. Cl.
*H01M 8/04014* (2016.01)
*H01M 8/04007* (2016.01)
(Continued)

(52) U.S. Cl.
CPC ... *H01M 8/04014* (2013.01); *H01M 8/04074* (2013.01); *H01M 8/04097* (2013.01);
(Continued)

(58) Field of Classification Search
CPC ......... H01M 8/04014; H01M 8/04074; H01M 8/04097; H01M 8/04164; H01M 8/04753; H01M 8/0618
See application file for complete search history.

(56) References Cited

U.S. PATENT DOCUMENTS

| | | | |
|---|---|---|---|
| 2008/0145726 A1* | 6/2008 | Nagasaka | B60L 58/33 429/441 |
| 2011/0223500 A1* | 9/2011 | Uematsu | H01M 8/0668 429/415 |
| 2017/0309939 A1* | 10/2017 | Yukimasa | H01M 8/04097 |

FOREIGN PATENT DOCUMENTS

| | | |
|---|---|---|
| JP | H07-211336 | 8/1995 |
| JP | 2007-323954 | 12/2007 |
| (Continued) | | |

OTHER PUBLICATIONS

Korean Notice of Allowance dated Jul. 2, 2024, issued in Application No. 10-2021-0120160.
(Continued)

*Primary Examiner* — Stewart A Fraser
(74) *Attorney, Agent, or Firm* — KED & ASSOCIATES, LLP

(57) ABSTRACT

A fuel cell system includes: a stack generating electric power using reformed gas; a fuel processing device supplying reformed gas; a first gas passage connecting the stack and the fuel processing device, and carrying the reformed gas; a second gas passage connecting the stack and the fuel processing device and carrying an anode off gas (AOG) discharged from the stack; a buffer tank storing the AOG; a first buffer tank passage connecting the buffer tank and the second gas passage; a second buffer tank passage carrying the AOG stored in the buffer tank; a gas mixer connected to the second buffer tank passage and supplying the AOG stored in the buffer tank to the stack; and a controller controlling the gas mixer to supply the anode off gas stored in the buffer tank to the stack so as to preheat the stack or remove air in the stack.

7 Claims, 12 Drawing Sheets

(51) Int. Cl.
  *H01M 8/04089* (2016.01)
  *H01M 8/04119* (2016.01)
  *H01M 8/04746* (2016.01)
  *H01M 8/0612* (2016.01)

(52) U.S. Cl.
  CPC ... *H01M 8/04164* (2013.01); *H01M 8/04753* (2013.01); *H01M 8/0618* (2013.01)

(56) References Cited

FOREIGN PATENT DOCUMENTS

| | | |
|---|---|---|
| JP | 2010-108834 | 5/2010 |
| KR | 10-2007-0098072 | 10/2007 |
| KR | 10-2009-0004177 | 1/2009 |
| KR | 10-2012-0071288 | 7/2012 |
| KR | 10-2021-0029213 | 3/2021 |

OTHER PUBLICATIONS

Korean Office Action dated Nov. 16, 2023 issued in Application No. 10-2021-0120160.

* cited by examiner

FUEL CELL SYSTEM

CROSS-REFERENCE TO RELATED APPLICATION(S)

This application claims the priority benefit of Korean Patent Application No. 10-2021-0120160, filed on Sep. 9, 2021, the disclosure of which is incorporated herein by reference in its entirety.

BACKGROUND

1. Field

The present disclosure relates to a fuel cell system, and more particularly, to a fuel cell system that preheats a stack upon entering an initial power generation operation and removes air remaining in the stack during a stop operation.

2. Background

A fuel cell system is a power generation system that generates electric energy by electrochemically reacting hydrogen contained in hydrocarbon-based material, such as methanol, ethanol, or natural gas, with oxygen.

A typical fuel cell system is discussed in Korean Patent Publication No. 10-2012-0071288 and may include a fuel processing device for reforming a fuel containing hydrogen atoms into hydrogen gas, and a stack for generating electric energy by using hydrogen gas supplied from the fuel processing device. In addition, the fuel cell system may further include a heat exchanger and a cooling water pipe for cooling the stack and recovering heat, a power converter for converting a produced DC power into AC power, and the like.

Meanwhile, in order to remove oxygen remaining in a stack after a power generation operation is terminated, Korean Patent Publication No. 10-2011-0019274 discloses a method of installing a separate branch valve that branches from a hydrogen purge valve in a hydrogen purge line of a fuel supply system that supplies fuel to the stack, and allowing hydrogen passing through the branch valve to purge a cathode electrode part in the stack via an air supply line when the power generation operation is terminated. However, an Anode-off gas (AOG) to be supplied to the cathode electrode part must be additionally generated and supplied. Therefore, there is a need to prevent a reduction in a lifespan of the stack by removing oxygen remaining in the cathode electrode part of the stack after the power generation operation is terminated.

BRIEF DESCRIPTION OF THE DRAWINGS

The embodiments will be described in detail with reference to the following drawings in which like reference numerals refer to like elements wherein.

DETAILED DESCRIPTION

Figure 1:
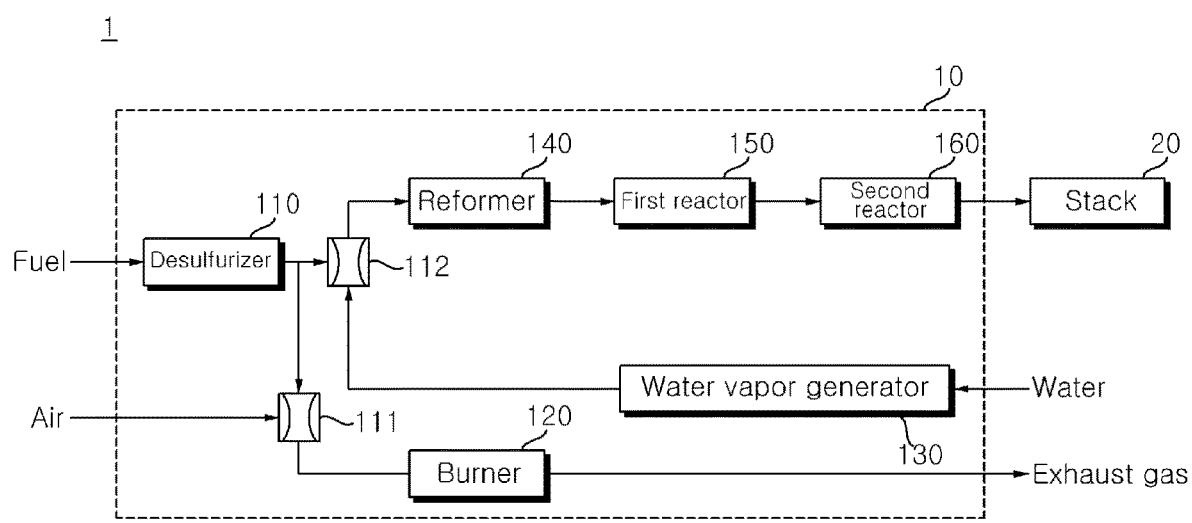
FIG. 1 is a schematic diagram of a configuration of a fuel processing device according to an embodiment of the present disclosure.

FIG. 1 is a schematic diagram of a configuration of a fuel processing device according to an embodiment of the present disclosure. Referring to FIG. 1, fuel processing device 10 may include a desulfurizer 110, a burner 120, a water vapor generator 130, a reformer 140, a first reactor 150 and/or a second reactor 160. The fuel processing device 10 may further include at least one mixer 111, 112.

The desulfurizer 110 may perform a desulfurization process for removing sulfur compound contained in a fuel gas. For example, the desulfurizer 110 may include an adsorbent material therein. At this time, the sulfur compound contained in the fuel gas passing through the inside of the desulfurizer 110 may be adsorbed by the adsorbent material. For example, the adsorbent may be composed of metal oxide, zeolite, activated carbon, or the like. The desulfurizer 110 may further include a filter for removing foreign substances contained in the fuel gas.

The burner (or heater) 120 may supply heat to the reformer 140 to promote a reforming reaction in the reformer 140. For example, the fuel gas discharged from the desulfurizer 110 and the air flowing from the outside may be mixed in a first mixer 111 and supplied to the burner 120. In this case, the burner 120 may generate combustion heat by burning the mixed gas of the fuel gas and external air. In this case, the internal temperature of the reformer 140 may be maintained at an appropriate temperature (e.g., 800° C.) by the heat supplied from the burner 120. Meanwhile, an exhaust gas generated in the burner 120 by combustion of the mixed gas may be discharged to the outside of the fuel processing device 10.

The water vapor generator 130 may vaporize water and discharge water vapor. For example, the water vapor generator 130 may absorb heat from the exhaust gas generated by the burner 120, the first reactor 150, and/or the second reactor 160 to vaporize water. In one example, the water vapor generator 130 may be disposed adjacent to a pipe through which the exhaust gas discharged from the first reactor 150, the second reactor 160, and/or the burner 120 flows to receive heat from the pipe.

The reformer 140 may perform a reforming process of generating hydrogen gas from the fuel gas from which the sulfur compound has been removed, such as by using a catalyst. For example, fuel gas discharged from the desulfurizer 110 and water vapor discharged from the water vapor generator 130 may be mixed in a second mixer 112 and supplied to the reformer 140. In this case, the fuel gas and water vapor supplied to the reformer 140 may undergo a reforming reaction in the reformer 140, and hydrogen gas may be generated through the reforming reaction.

The first reactor 150 may reduce carbon monoxide that is generated by the reforming reaction and is contained in the gas discharged from the reformer 140. For example, carbon monoxide contained in the gas discharged from the reformer 140 may react with water vapor in the first reactor 150 to generate carbon dioxide and hydrogen. In this case, the internal temperature of the first reactor 150 may be lower than the internal temperature of the reformer 140, and higher (e.g., 200° C.) than the room temperature. The first reactor 150 may be referred to as a shift reactor.

The second reactor 160 may reduce remaining carbon monoxide included in the gas discharged from the first reactor 150. For example, a preferential oxidation (PROX) reaction may occur in second reactor 160 such that carbon monoxide contained in the gas discharged from the first reactor 150 reacts with oxygen inside the second reactor 160.

Meanwhile, in the case of the preferential oxidation (PROX) reaction, an additional supply of air may be used to supply a sufficiently large amount of oxygen, and hydrogen generated in reformer 140 may be diluted by the additionally supplied air, so that the concentration of hydrogen supplied to the stack 20 may be reduced. Therefore, in order to overcome this concern, a selective methanation reaction in which carbon monoxide and hydrogen are reacted may be utilized.

Meanwhile, the gas discharged from the fuel processing device 10 via the reformer 140, the first reactor 150, and/or the second reactor 160 may be referred to as a reformed gas. The stack 20 may generate electric energy by causing an electrochemical reaction with the reformed gas supplied from the fuel processing device 10.

The stack 20 may be configured by laminating single cells in which an electrochemical reaction occurs. A single cell may include a membrane electrode assembly (MEA) in which an anode and a cathode are disposed around an electrolyte membrane, a separator, and the like. At the anode of the membrane electrode assembly, hydrogen may be separated into hydrogen ions and electrons by a catalyst to generate electricity. In addition, at the cathode of the membrane electrode assembly, hydrogen ions and electrons may combine with oxygen to produce water.

The stack 20 may further include a stack heat exchanger (not shown) for dissipating heat generated in an electrochemical reaction process. The stack heat exchanger may be a heat exchanger using water as a refrigerant. For example, cooling water supplied to the stack heat exchanger may absorb heat generated in the electrochemical reaction process, and water that is warmed by the absorbed heat may be discharged to the outside of the stack heat exchanger.

Figure 2:
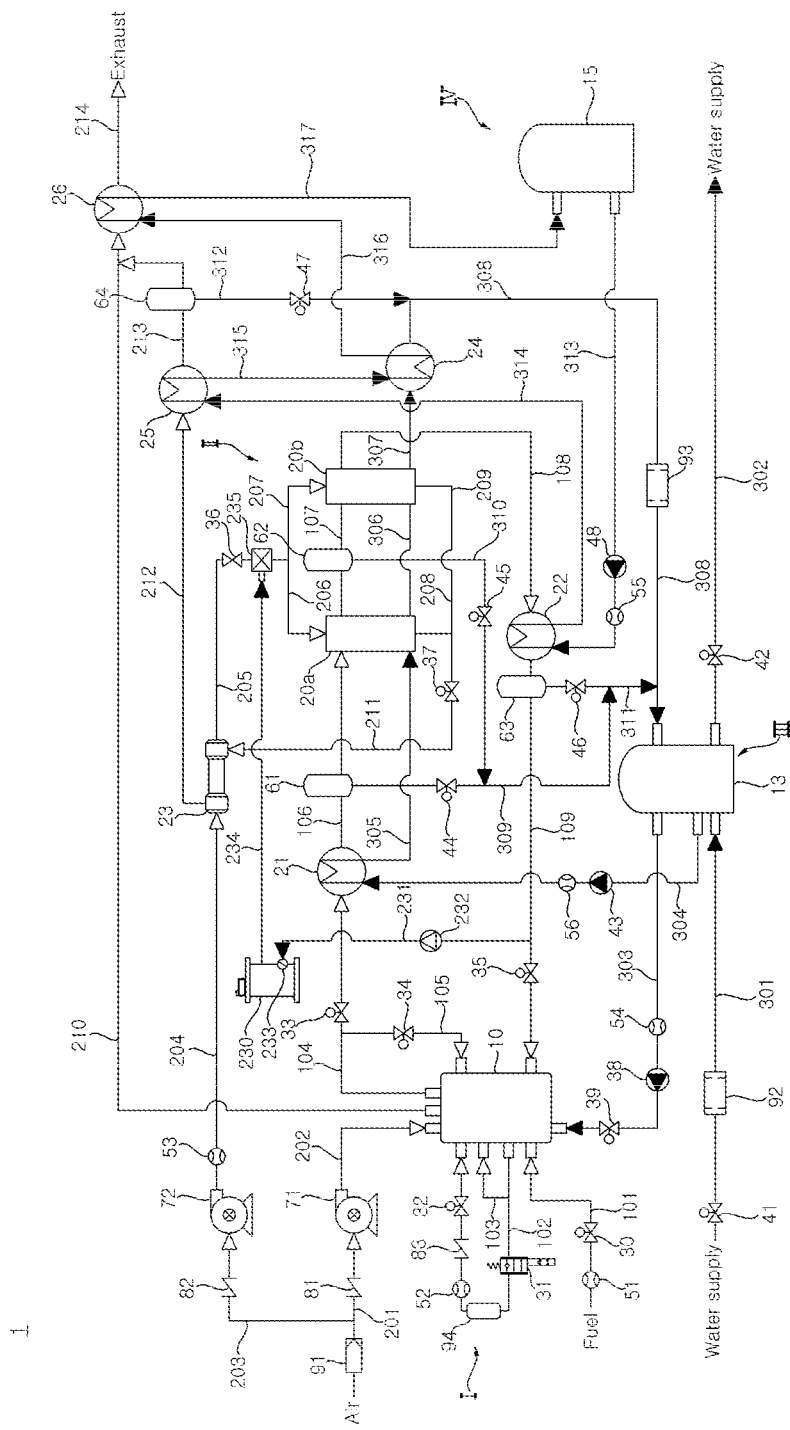
FIGS. 2 and 3 are block diagrams of a fuel cell system according to an embodiment of the present disclosure.
Figure 3:
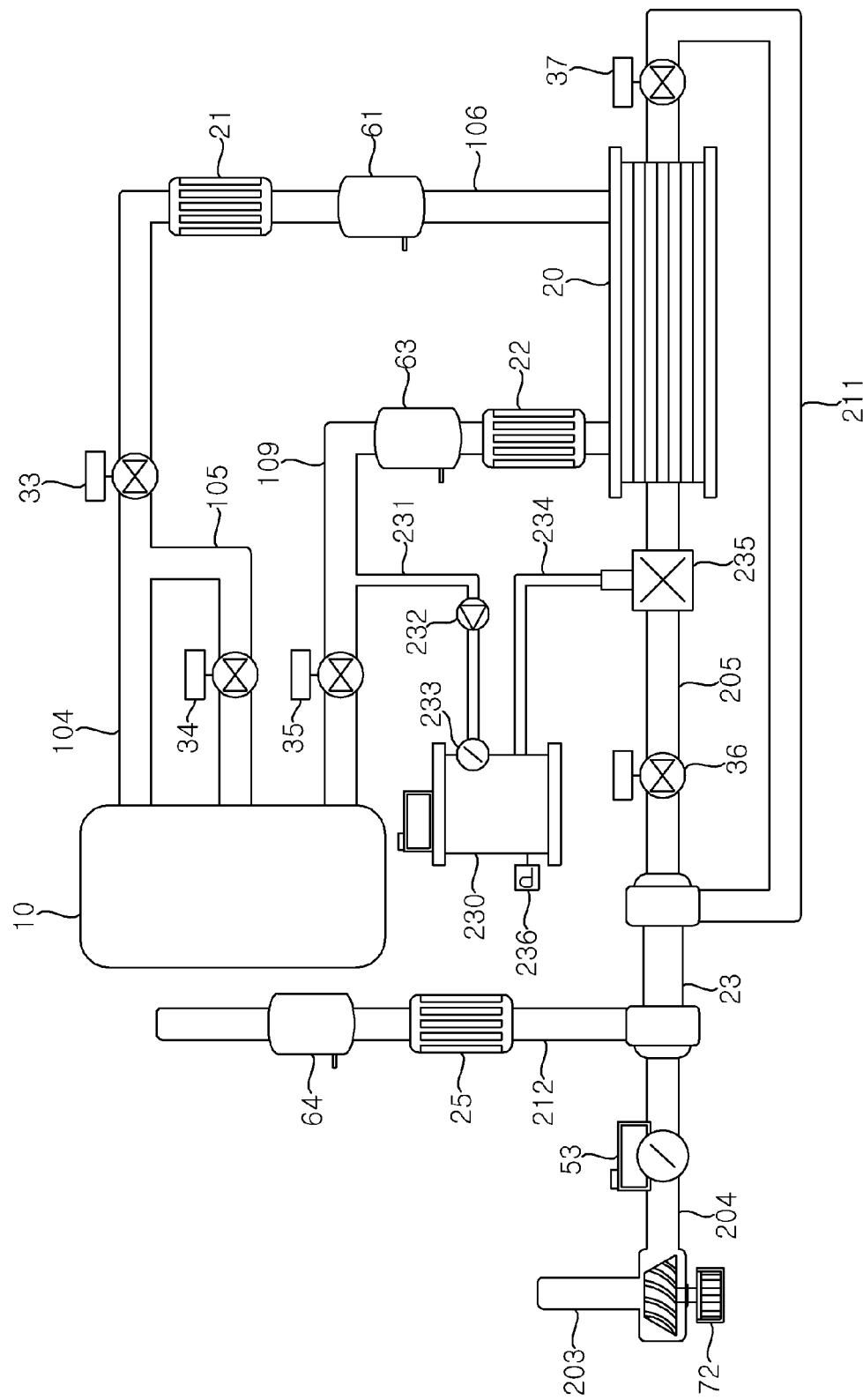

FIGS. 2 and 3 are block diagrams of a fuel cell system 1 including the fuel processing device 10 according to an embodiment of the present disclosure. Referring to FIG. 2, in certain implementations, a fuel cell system 1 may include a fuel processing unit I, a power generation unit II, a cooling water circulation unit III, and/or a heat recovery unit IV.

In certain implementations, the fuel processing unit I may include the fuel processing device 10, a fuel valve 30 for adjusting the flow of fuel gas supplied to the fuel processing device 10, a first blower 71 for flowing air to the fuel processing device 10, and the like. It should be appreciated that the fuel processing unit I may include fewer, additional, or different components.

In certain implementations, the power generation unit II may include a stack 20a, 20b, a reformed gas heat exchanger 21 in which heat exchange of the reformed gas discharged from the fuel processing device 10 occurs, an anode-off gas (AOG) heat exchanger 22 in which heat exchange of the gas that is discharged without reacting in the stack 20a, 20b occurs, a humidifier 23 for supplying moisture to the air supplied to the stack 20a, 20b, a second blower 72 for flowing air into the stack 20a, 20b, and the like. Here, the gas that is discharged without reacting in the stack 20a, 20b may be referred to as an anode-off gas (AOG). In an embodiment of the present disclosure, the fuel cell system 1 may include two stacks 20a and 20b, but the present disclosure is not limited thereto and the fuel cell system 1 may include a different number of stacks 20. It should be appreciated that the power generation unit II may include fewer, additional, or different components.

In certain implementations, the cooling water circulation unit III may include a water supply tank 13 for storing water generated in the fuel cell system 1, a water pump 38 for flowing water to the fuel processing device 10, a water supply valve 39 for adjusting the flow of water supplied to the fuel processing device 10, a cooling water pump 43 for flowing water to the reformed gas heat exchanger 21, and the like. It should be appreciated that the cooling water circulation unit III may include fewer, additional, or different components.

The heat recovery unit IV may include a heat recovery tank 15 for storing water used for heat exchange, a hot water pump 48 for flowing water stored in the heat recovery tank 15 to the outside of the heat recovery tank 15, and the like. It should be appreciated that the heat recovery unit IV may include fewer, additional, or different components.

The fuel valve 30 may be disposed in a fuel supply passage 101 through which the fuel gas supplied to the fuel processing device 10 flows. Fuel valve 30 may have a varying degree of opening, and the flow rate of the fuel gas supplied to the fuel processing device 10 may be adjusted in correspondence with the degree of opening of the fuel valve 30. For example, the fuel valve 30 may be closed to block the fuel supply passage 101 so that the supply of fuel gas to the fuel processing device 10 may be stopped. A flow rate of fuel gas flowing in the fuel supply passage 101 may be estimated based on the degree of opening of the fuel valve 30. In another example, a first fuel flow meter 51 for detecting a flow rate of fuel gas flowing in the fuel supply passage 101 may be disposed in the fuel supply passage 101.

A first blower 71 may be connected to a first external air inlet passage 201 and a fuel-side air supply passage 202. The first blower 71 may generate a flow of air from the outside through the first external air inlet passage 201 and to the fuel processing device 10 through the fuel-side air supply passage 202.

The air flowing into the fuel processing device 10 through the fuel-side air supply passage 202 may be supplied to the burner 120 of the fuel processing device 10. For example, the air flowing into the fuel processing device 10 may be mixed with the fuel gas discharged from the desulfurizer 110 in the first mixer 111 and may be supplied to the burner 120.

An air filter 91 may be disposed in the first external air inlet passage 201. The air filter 91 may remove foreign substances such as dust contained in the air and/or a first air-side check valve 81 for restricting the flow direction of air.

The fuel processing unit I may include a first internal gas passage 102 through which the fuel gas discharged from the desulfurizer 110 flows to the reformer 140. One or more of a proportional control valve 31, an internal fuel valve 32 for adjusting the flow of fuel gas flowed into the reformer 140, a second fuel flow meter 52 for detecting the flow rate of the fuel gas flowing in the internal gas passage 102, a fuel-side check valve 83 for restricting the flow direction of the fuel gas flowing in the internal gas passage 102, and/or a sulfur detecting device 94 may be disposed in the first internal gas passage 102.

The proportional control valve 31 may adjust the flow rate, pressure, and the like of fuel gas that is discharged from the desulfurizer 110 and flows to the reformer 140. For example, proportional control valve 31 may operate through internal/external feedback in an electric control manner.

The sulfur detection device 94 may detect sulfur contained in the fuel gas discharged from the desulfurizer 110. The sulfur detecting device 94 may include an indicator that changes its color in response to a sulfur compound not removed by the adsorbent of the desulfurizer 110. Here, the indicator of sulfur detecting device 94 may include phenolphthalein, a molybdenum compound, and the like.

The fuel processing unit I may include a second internal gas passage 103 through which the fuel gas discharged from the desulfurizer 110 flows to the burner 120. The burner 120 may use the fuel gas flowed through the second internal gas passage 103 for combustion.

The first internal gas passage 102 and the second internal gas passage 103 may communicate with each other. The fuel processing device 10 may be connected to a water supply passage 303 through which water discharged from the water supply tank 13 flows. One or more of a water pump 38, a water supply valve 39 for adjusting the flow of water and/or a water flow meter 54 for detecting a flow rate of water flowing in the water supply passage 303 may be disposed in the water supply passage 303.

The exhaust gas generated in the burner 120 of the fuel processing device 10 may be discharged from the fuel processing device 10 through an exhaust gas discharge passage 210.

The fuel processing device 10 may be connected to a reformed gas discharge passage 104. The reformed gas discharged from the fuel processing device 10 may flow through the reformed gas discharge passage 104.

The reformed gas discharge passage 104 may be connected to a reformed gas heat exchanger 21 in which heat exchange of the reformed gas occurs. A reformed gas valve 33 for adjusting the flow of reformed gas flowing into the reformed gas heat exchanger 21 may be disposed in the reformed gas discharge passage 104.

The reformed gas discharge passage 104 may communicate with a bypass passage 105 through which the reformed gas discharged from the fuel processing device 10 flows to the fuel processing device 10. The bypass passage 105 may be connected to the fuel processing device 10. The reformed gas flowing into the fuel processing device 10 through the bypass passage 105 may be used as a fuel for combustion of the burner 120. A bypass valve 34 for adjusting the flow of the reformed gas flowing into the fuel processing device 10 may be disposed in the bypass passage 105.

The reformed gas heat exchanger 21 may be connected to the reformed gas discharge passage 104 through which the reformed gas discharged from the fuel processing device 10 flows. The reformed gas heat exchanger 21 may be connected to a cooling water supply passage 304 through which water discharged from the water supply tank 13 flows. The reformed gas heat exchanger 21 may exchange heat with the reformed gas flowed through the reformed gas discharge passage 104 with water supplied through the cooling water supply passage 304.

In the cooling water supply passage 304, a cooling water pump 43 for flowing the water stored in the water supply tank 13 to the reformed gas heat exchanger 21, and/or a cooling water flow meter 56 for detecting the flow rate of water flowing in the cooling water supply passage 304 may be disposed.

The reformed gas heat exchanger 21 may be connected to a stack gas supply passage 106. The reformed gas discharged from the reformed gas heat exchanger 21 may flow to the stack 20a, 20b through the stack gas supply passage 106.

A reformed gas moisture removal device 61 for adjusting the amount of moisture contained in the reformed gas may be disposed in the stack gas supply passage 106. The reformed gas flowing into the reformed gas moisture removal device 61 may be discharged from the reformed gas moisture removal device 61 after moisture is removed.

Condensed water generated in the reformed gas moisture removal device 61 may be discharged from the reformed gas moisture removal device 61 and flow to a first water recovery passage 309. A first water recovery valve 44 for adjusting the flow of water may be disposed in the first water recovery passage 309.

The stack 20a, 20b may generate electric energy by causing an electrochemical reaction in the reformed gas that flowed through the stack gas supply passage 106. In an embodiment, when the fuel cell system 1 includes a plurality of stack 20a, 20b, the reformed gas discharged from the first stack 20a without reacting therein may be directed to the second stack 20b to additionally cause an electrochemical reaction in the second stack 20b.

A second blower 72 may be connected to at least one of a second external air inlet passage 203 communicating with the first external air inlet passage 201, and/or to a stack side air inlet passage 204. The second external air inlet passage 203 may be connected to the rear end of the air filter 91. The second blower 72 may cause air to flow through the second external air inlet passage 203 toward the stack 20 side through the stack side air inlet passage 204. A second air-side check valve 82 for restricting the flow direction of air may be disposed in the second external air inlet passage 203.

An air flow meter 53 for detecting a flow rate of air flowing in the stack-side air inlet passage 204 may be disposed in the stack-side air inlet passage 204. The humidifier 23 may supply moisture to the air flowed through the stack-side air inlet passage 204, and may discharge air containing moisture through the stack-side air supply passage 205. A stack-side air supply valve 36 for adjusting the flow of air supplied to the stack 20 may be disposed in the stack-side air supply passage 205.

The stack-side air supply passage 205 may be connected to individual supply passages 206 and 207 respectively corresponding to the stacks 20a and 20b. Air flowing through the stack-side air supply passage 205 may be supplied to the stack 20a, 20b through the individual supply passages 206 and 207.

Two or more of stacks 20a and 20b may be connected to each other by a gas connection passage 107. The reformed gas discharged without reacting in the first stack 20a may flow into the second stack 20b through the gas connection passage 107.

An additional moisture removal device 62 may be disposed in the gas connection passage 107 to remove water that is generated by condensing the reformed gas while the reformed gas passes through the first stack 20a. The water generated by the additional moisture removal device 62 may be discharged from the additional moisture removal device 62, and flow to a second water recovery passage 310. A second water recovery valve 45 for adjusting the flow of water may be disposed in the second water recovery passage 310. The second water recovery passage 310 may be connected to the first water recovery passage 309.

An anode-off gas (AOG) discharged without reacting in the stack 20a, 20b may flow through the stack gas discharge passage 108. The AOG heat exchanger 22 may be connected to the stack gas discharge passage 108 through which the anode-off gas AOG discharged from the stack 20a, 20b flows. The AOG heat exchanger 22 may be connected to a hot water supply passage 313 through which water discharged from the heat recovery tank 15 flows. The AOG heat exchanger 22 may exchange heat between the anode-off gas AOG flowed through the stack gas discharge passage 108 and water supplied through the hot water supply passage 313.

One or more of a hot water pump 48 for circulating the water stored in the heat recovery tank 15 to the AOG heat exchanger 22, and/or a hot water flow meter 55 for detecting the flow rate of water flowing in the hot water supply passage 313 may be disposed in the hot water supply passage 313.

The AOG heat exchanger 22 may be connected to the AOG supply passage 109, and may discharge the heat-exchanged anode-off gas AOG through the AOG supply passage 109. The anode-off gas AOG discharged from the AOG heat exchanger 22 may flow to the fuel processing device 10 through the AOG supply passage 109. The anode-off gas AOG supplied to the fuel processing device 10 through the AOG supply passage 109 may be used as fuel for combustion in the burner 120. In addition, the anode-off gas AOG discharged from the AOG heat exchanger 22 may flow to a buffer tank 230 through a first buffer tank passage 231. For example, a portion of the anode-off gas AOG discharged from the AOG heat exchanger 22 may flow to the fuel processing device 10, and the remainder may flow to the buffer tank 230.

The buffer tank 230 may store the anode-off gas AOG discharged from the stack 20. The anode-off gas AOG stored in the buffer tank 230 may be utilized in a stack preheating operation or a stop operation (purge operation) described later. The buffer tank 230 may be connected to the AOG supply passage 109 through the first buffer tank passage 231. The buffer tank 230 may be connected to a gas mixer 235 through a second buffer tank passage 234. A buffer tank valve 233 for adjusting the flow of the anode-off gas AOG flowed into the buffer tank 230 may be disposed in the buffer tank 230. For example, the buffer tank valve 233 may be disposed in an inlet end of the buffer tank 230. The buffer tank 230 may include a pressure sensor 236 for measuring the pressure of the anode-off gas AOG stored in the buffer tank 230.

One end of the first buffer tank passage 231 may be connected to the AOG supply passage 109, such as connecting the first buffer tank passage 231 at a point between an AOG valve 35 and an AOG moisture removal device 63. The other end of the first buffer tank passage 231 may be connected to the buffer tank 230. A buffer tank compressor 232 for compressing the anode-off gas AOG flowing into the buffer tank 230 may be disposed in the first buffer tank passage 231. The buffer tank compressor 232 may be disposed in front of the buffer tank valve 233.

One end of the second buffer tank passage 234 may be connected to the buffer tank 230. The other end of the second buffer tank passage 234 may be connected to the gas mixer 235. The gas mixer 235 for mixing the anode-off gas AOG discharged from the buffer tank 230 with the air flowing into the stack 20 may be disposed in the second buffer tank passage 234. The gas mixer 235 may be located between the stack side air supply valve 36 and the stack 20. The gas mixer 235 may adjust the flow of the anode-off gas AOG discharged from the buffer tank 230. For example, the gas mixer 235 may be a venturi type mixer.

In the AOG supply passage 109, an AOG moisture removal device 63 that controls the amount of moisture contained in the anode-off gas AOG and/or the AOG valve 35 for adjusting the flow of the anode-off gas AOG supplied to the fuel processing device 10 may be disposed. The anode-off gas AOG flowing into the AOG moisture removal device 63 may be discharged from the AOG moisture removal device 63 after moisture is removed.

The condensed water generated in the AOG moisture removal device 63 may be discharged from the AOG moisture removal device 63, and flow through a third water recovery passage 311. A third water recovery valve 46 for adjusting the flow of water may be disposed in the third water recovery passage 311. The third water recovery passage 311 may be connected to the first water recovery passage 309.

A stack-side air discharge passage 211 may be connected to individual discharge passages 208 and 209 that correspond, respectively, to the stacks 20a and 20b. The air discharged from the stack 20a, 20b may flow to the stack-side air discharge passage 211 through the individual discharge passage 208, 209. In this case, the air flowing through the stack-side air discharge passage 211 may include moisture generated by an electrochemical reaction occurring in the stack 20a, 20b. A stack-side air discharge valve 37 for adjusting the flow of air discharged from the stack 20 may be disposed in the stack-side air discharge passage 211.

The stack-side air discharge passage 211 may be connected to the humidifier 23. The humidifier 23 may supply moisture to the air flowing into the stack 20 by using moisture contained in the air supplied through the stack-side air discharge passage 211. The air supplied to the humidifier 23 through the stack-side air discharge path 211 may be discharged to a humidifier discharge passage 212 through the humidifier 23.

The water supply tank 13 may be connected to a water inlet passage 301 and may store water supplied through the water inlet passage 301. At least one of a first liquid filter 92 for removing foreign substances contained in water supplied from the outside and/or a water inlet valve 41 for adjusting the flow of water flowing into the water supply tank 13 may be disposed in the water inlet passage 301.

The water supply tank 13 may be connected to a water discharge passage 302 and may discharge at least a portion of the water stored in the water supply tank 13 to the outside through the water discharge passage 302. A water discharge valve 42 for adjusting the flow of water discharged from the water supply tank 13 may be disposed in the water discharge passage 302.

The water supply tank 13 may be connected to a water storage passage 308 and may receive and store water flowing through the water storage passage 308. For example, water discharged from one or more of the reformed gas moisture removal device 61, the additional moisture removal device 62, the AOG moisture removal device 63, and/or an air moisture removal device 64 may flow through the third water recovery passage 311 and through the water storage passage 308 to be received by the water supply tank 13. A second liquid filter 93 for removing foreign substances contained in the water recovered to the water supply tank 13 may be disposed in the water storage passage 308.

At least a portion of the water stored in the water supply tank 13 may flow to the reformed gas heat exchanger 21 by the cooling water pump 43, and may exchange heat with the reformed gas in the reformed gas heat exchanger 21. Water discharged from the reformed gas heat exchanger 21 may flow into the stack 20a, 20b through a stack water supply passage 305.

Water flowing into the stack 20a, 20b through the stack water supply passage 305 may cool the stack 20a, 20b. Water flowing into the stack 20a, 20b may flow along a stack heat exchanger (not shown) included in the stack 20a, 20b, and may absorb heat generated by an electrochemical reaction occurring in the stack 20a, 20b.

A plurality of stacks 20a and 20b may be connected by a water connection passage 306. Water discharged from the first stack 20a may flow into the second stack 20b through the water connection passage 306.

Water discharged from the stack 20a, 20b may flow into a cooling water heat exchanger 24 through a stack water discharge passage 307. The cooling water heat exchanger 24 may exchange heat of the water discharged from the stack 20a, 20b with the water discharged from the heat recovery tank 15. The water discharged from the stack 20a, 20b may flow to the water storage passage 308 through the cooling water heat exchanger 24.

The water discharged from the heat recovery tank 15 by the hot water pump 48 may flow into the AOG heat exchanger 22 through the hot water supply passage 313. The water heat-exchanged with the anode-off gas (AOG) in the AOG heat exchanger 22 may be discharged to a first hot water circulation circuit 314.

An air heat exchanger 25 may be connected to the humidifier discharge passage 212 through which the air discharged from the humidifier 23 flows. The air heat exchanger 25 may be connected to the first hot water circulation circuit 314 through which the water discharged from the AOG heat exchanger 22 flows. The air heat exchanger 25 may exchange heat of air flowing through the humidifier discharge passage 212 with water flowing through the first hot water circulation circuit 314.

The air heat-exchanged in the air heat exchanger 25 may be discharged from the air heat exchanger 25 through an air discharge passage 213. The air discharge passage 213 may communicate with the exhaust gas discharge passage 210, and the exhaust gas flowing in the exhaust gas discharge passage 210 and the air flowing in the air exhaust passage 213 may be mixed.

An air moisture removal device 64 may be disposed in the air discharge passage 213. The air moisture removal device 64 may adjust the amount of moisture contained in the air discharged to the outside through the air discharge passage 213. The air flowing into the air moisture removal device 64 may be discharged from the air moisture removal device 64 after the moisture is removed.

Condensed water generated by the air moisture removal device 64 may be discharged from the air moisture removal device 64 and flow through a fourth water recovery passage 312. A fourth water recovery valve 47 for adjusting the flow of water may be disposed in the fourth water recovery passage 312. The fourth water recovery passage 312 may be connected to the water storage passage 308.

The water heat-exchanged in the air heat exchanger 25 may be discharged from the air heat exchanger 25 through a second hot water circulation passage 315. The water discharged from the air heat exchanger 25 may flow into the cooling water heat exchanger 24 through the second hot water circulation passage 315.

The cooling water heat exchanger 24 may exchange heat between the water flowing through the stack water discharge path 307 and the water flowing through the second hot water circulation passage 315.

An exhaust heat exchanger 26 may be connected to the exhaust gas discharge passage 210 through which exhaust gas flows. The exhaust heat exchanger 26 may be connected to a third hot water circulation passage 316 through which the water discharged from the cooling water heat exchanger 24 flows. The exhaust heat exchanger 26 may exchange heat of the exhaust gas flowing through the exhaust gas discharge passage 210 with the water flowing through the third hot water circulation passage 316.

The exhaust gas heat-exchanged in the exhaust heat exchanger 26 may be discharged to an exhaust passage 214, and the exhaust gas flowing in the exhaust passage 214 may be discharged to the outside. The water heat-exchanged in the exhaust heat exchanger 26 may be discharged to a hot water recovery passage 317, and water flowing in the hot water recovery passage 317 may flow into the heat recovery tank 15.

Meanwhile, the fuel cell system 1 may further include at least one controller (not shown). The controller may include at least one processor. Here, the processor may be a general processor such as a central processing unit (CPU). Obviously, the processor may be a dedicated device such as an application-specific integrated circuit (ASIC) or other hardware-based processor.

The controller may control the overall operation of the fuel cell system 1. The controller may be connected to each component provided in the fuel cell system 1, and may transmit and/or receive signals between each component mutually. For example, the controller may process a signal received from each component provided in the fuel cell system 1, and transmit a control signal according to the signal processing result to each component provided in the fuel cell system 1.

Figure 4:
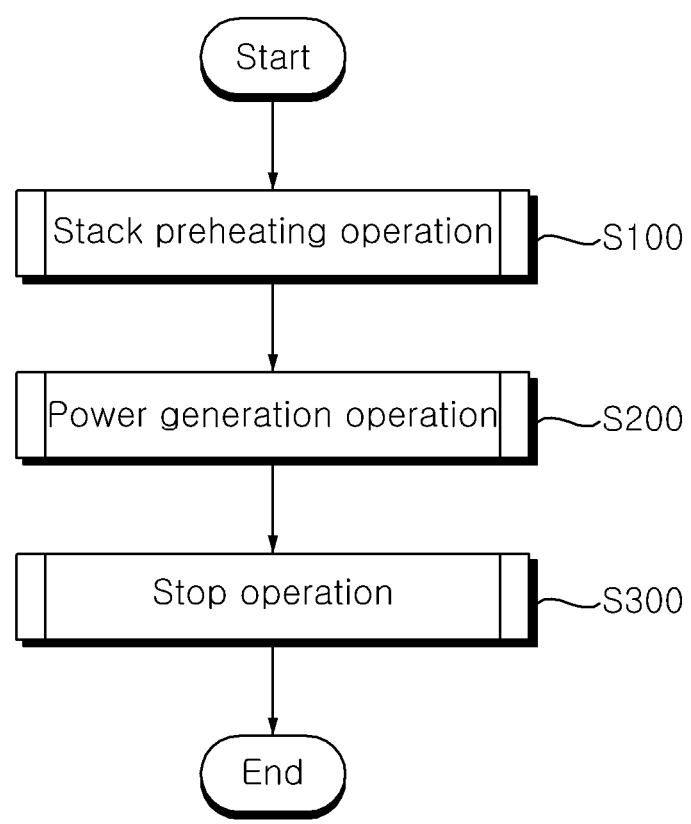
FIG. 4 is a flowchart of a method for controlling a fuel cell system according to an embodiment of the present disclosure.
Figure 5:
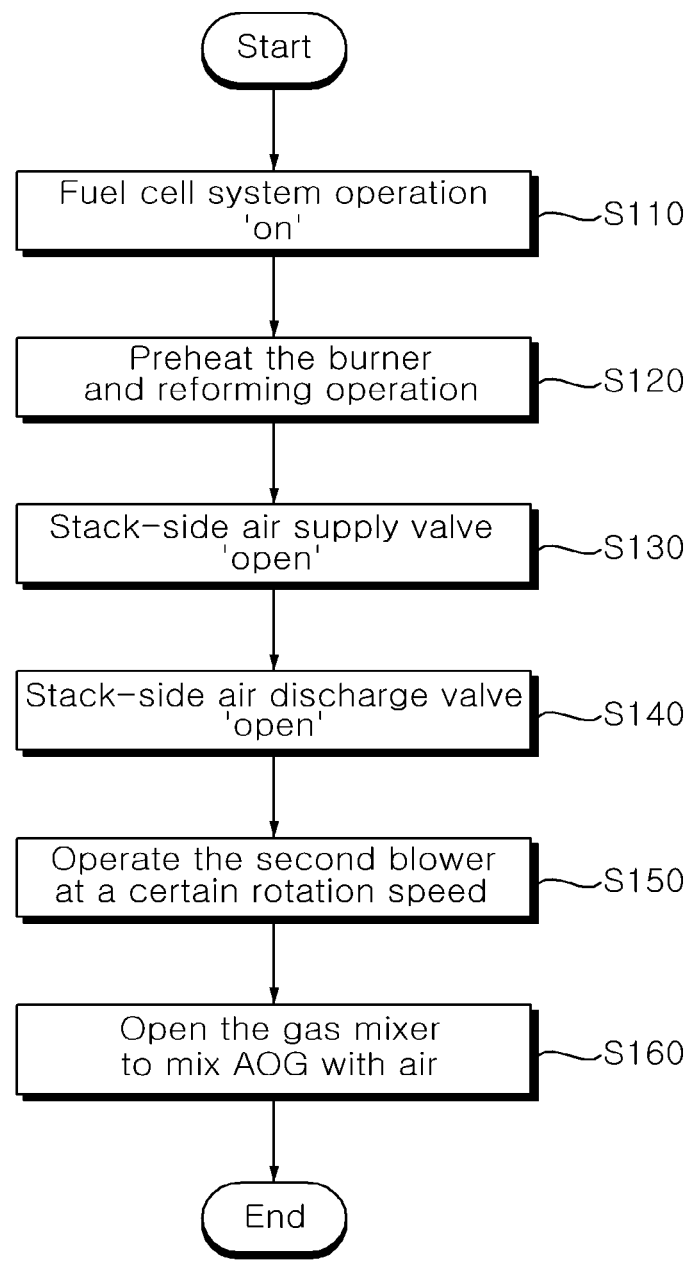
FIG. 5 is a flowchart illustrating a method for controlling a stack preheating operation according to an embodiment of the present disclosure.
Figure 6:
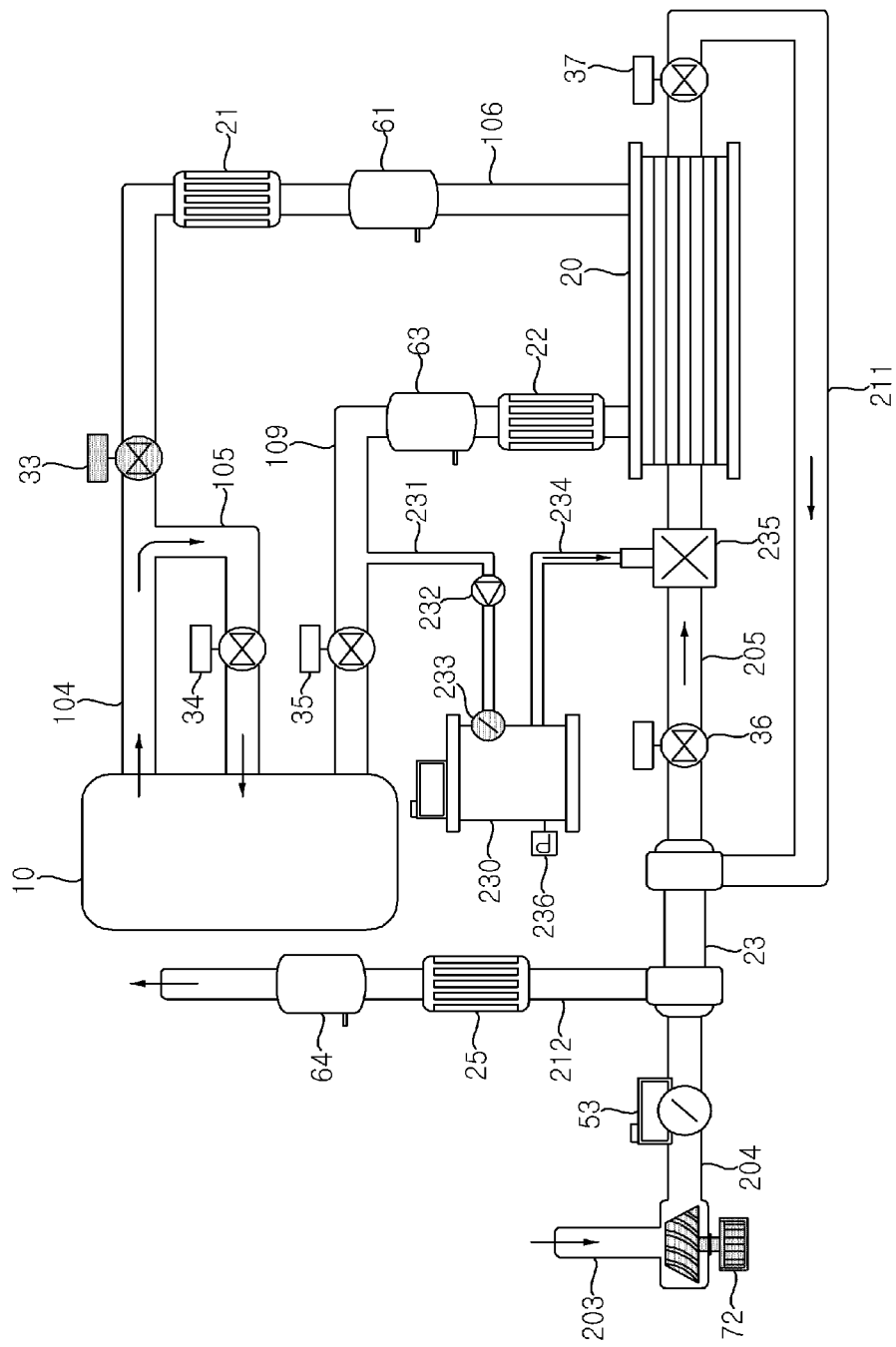
FIG. 6 is a diagram for explaining a stack preheating operation according to an embodiment of the present disclosure.

FIG. 4 is a flowchart of a method for controlling a fuel cell system according to an embodiment of the present disclosure. FIG. 5 is a flowchart illustrating a method for controlling a stack preheating operation. FIG. 6 is an operation diagram of a fuel cell system during a stack preheating operation.

Referring to FIG. 4, the fuel cell system 1 may perform a stack preheating operation for preheating the stack (S100). The stack preheating operation may be performed prior to a power generation operation described later. In general, when the fuel cell system 1 initially enters the power generation operation, the stack 20 is cooled in the same state as an ambient air temperature. Therefore, in order for the stack 20 to stably perform a high-efficiency power generation operation, a stack preheating operation in which the stack 20 is preheated with a certain temperature is performed. Hereinafter, a stack preheating operation will be described with reference to FIGS. 5 and 6.

Referring to FIGS. 5 and 6, the fuel cell system 1 may maintain an operation standby state for power generation operation (S110). Here, the operation standby state may mean a series of preparation processes for performing a power generation operation, such as supplying power to at least one component of the fuel cell system 1.

After S110, the fuel cell system 1 may perform an operation to preheat the burner 120 of the fuel processing device 10 (S120). For example, a gas in which fuel gas and air are mixed may be supplied to the burner 120 to generate combustion heat. In this case, the internal temperature of the reformer 140 may be gradually increased up to an appropriate temperature (e.g., 800° C.) at which the reforming reaction is promoted.

In addition, the fuel cell system 1 may block the fuel gas supply to the reformer 140 while the burner 120 is preheated. For example, the fuel cell system 1 may adjust the proportional control valve 31 so that the fuel gas discharged from the desulfurizer 110 is supplied to the burner 120, thereby blocking the supply of fuel gas to the reformer 140.

For example, the fuel cell system 1 may close all of the reformed gas valve 33, the bypass valve 34, and the AOG valve 35 while the burner 120 is preheated. At this time, since the supply of fuel gas to the reformer 140 is blocked, the reformer 140 does not generate reformed gas. In addition, the reformed gas or the anode-off gas AOG does not flow in the reformed gas discharge passage 104, the bypass passage 105, and the AOG supply passage 109.

In addition, the fuel cell system 1 may perform a reforming operation for initially generating the reformed gas (S120). For example, when the internal temperature of the reformer 140 increases to an appropriate temperature (e.g., 800° C.) due to the preheating of the burner 120, the fuel cell system 1 may start the reforming operation for initially generating the reformed gas. For example, when the internal temperature of the first reactor 150 is equal to or higher than the minimum temperature for carbon monoxide removal (e.g., 160° C.), the fuel cell system 1 may start the reforming operation for initially generating the reformed gas.

When the fuel cell system 1 performs an operation for initially generating the reformed gas, the proportional control valve 31 may be adjusted so that a portion of the fuel gas discharged from the desulfurizer 110 is supplied to the reformer 140, and the remaining portion is supplied to the burner 120.

Meanwhile, when the fuel cell system 1 starts the operation of initially generating the reformed gas, the water pump 38 may be driven so that the water vapor used in the reforming reaction is supplied to the reformer 140, thereby supplying water to the water vapor generator 130 of the fuel processing device 10. In this case, when the pressure of water vapor supplied to the reformer 140 is maintained at a minimum pressure for the reforming reaction or higher, for example, when a predetermined time elapses after the water pump 38 is driven, the fuel cell system 1 may supply the reformer 140 with a portion of the fuel gas discharged from the desulfurizer 110.

Meanwhile, while the operation of initially generating the reformed gas is performed, a ratio of hydrogen gas among the reformed gas discharged from the fuel processing device 10 may be lower than a preset minimum ratio. Here, the preset minimum ratio may mean a minimum value (e.g., 80%) of a ratio of hydrogen gas among reformed gas which can achieve a target power generation amount. At this time, when the reformed gas having a hydrogen gas ratio lower than the preset minimum ratio is supplied to the stack 20, since it may be difficult to generate at least a target power generation amount of electricity in the stack 20, the reformed gas discharged from the fuel processing device 10 may be reused as fuel for the burner 120.

For example, the fuel cell system 1 may close the reformed gas valve 33 and the AOG valve 35 and open the bypass valve 34, while performing the operation of initially generating the reformed gas. At this time, the reformed gas discharged from the fuel processing device 10 may flow back into the fuel processing device 10 through the reformed gas discharge passage 104 and the bypass passage 105, and may be used as fuel for the combustion of burner 120.

After S120, the fuel cell system 1 may open the stack-side air supply valve 36 (S130). Accordingly, the air humidified by the humidifier 23 may be supplied to the gas mixer 235 via the stack-side air supply valve 36.

After S130, the fuel cell system 1 may open the stack-side air discharge valve 37 (S140). Accordingly, the gas generated after the chemical reaction between the reformed gas and air in the stack 20 may be supplied to the humidifier 23 via the stack-side air discharge valve 37 and then discharged to the outside.

After S140, the fuel cell system 1 may operate the second blower 72 at a certain rotation speed or otherwise adjust an output air volume or intensity (S150). Accordingly, air may be supercharged from the outside to the stack 20 according to the operation of the second blower 72.

After S150, the fuel cell system 1 may open the gas mixer 235 to mix the anode-off gas AOG stored in the buffer tank 230 with air (S160). At this time, the buffer tank valve 233 may be closed so that the flow of the anode-off gas AOG stored in the buffer tank 230 may be directed toward the second buffer tank passage 234. Accordingly, the air supercharged from the second blower 72 and the anode-off gas AOG stored in the buffer tank 230 may be mixed in the gas mixer 235 and supplied to the stack 20, and the stack 20 may be rapidly preheated by an exothermic reaction according to a chemical reaction occurring from an inlet end of a cathode in the stack 20. Here, the anode-off gas AOG stored in the buffer tank 230 may be an anode-off gas AOG stored during a test operation of the fuel cell system 1 or an anode-off gas AOG remaining after a purge operation described later.

Figure 7:
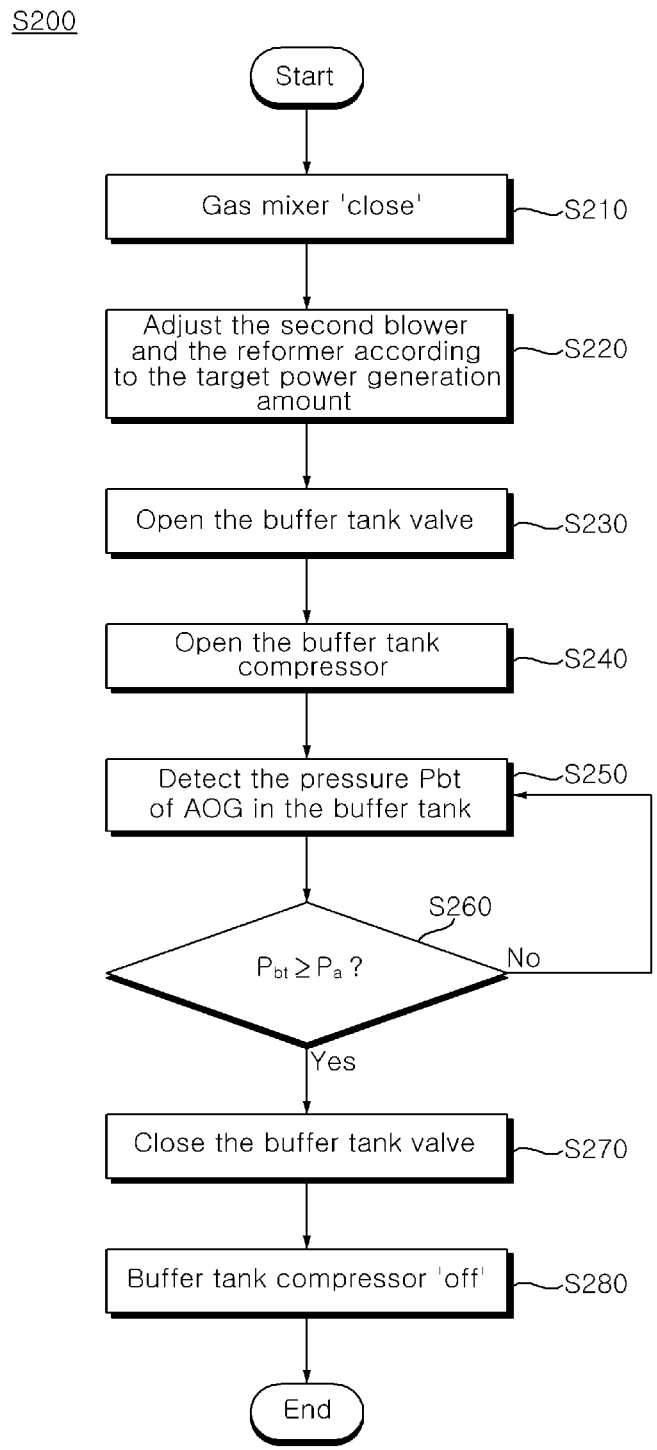
FIG. 7 is a flowchart of a method for controlling a power generation operation according to an embodiment of the present disclosure.
Figure 8A:
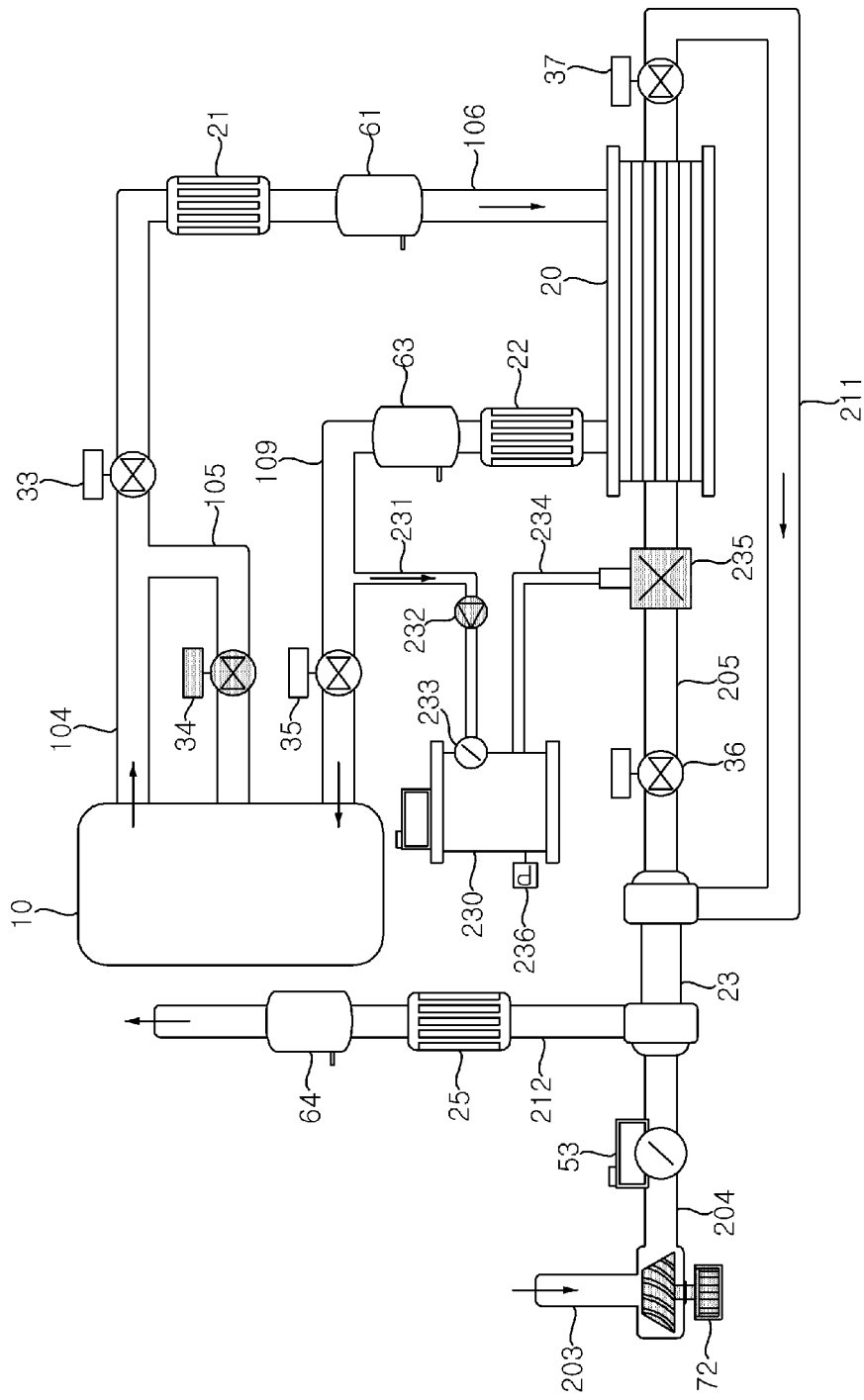
FIGS. 8A and 8B are diagrams for explaining a power generation operation according to an embodiment of the present disclosure.
Figure 8B:
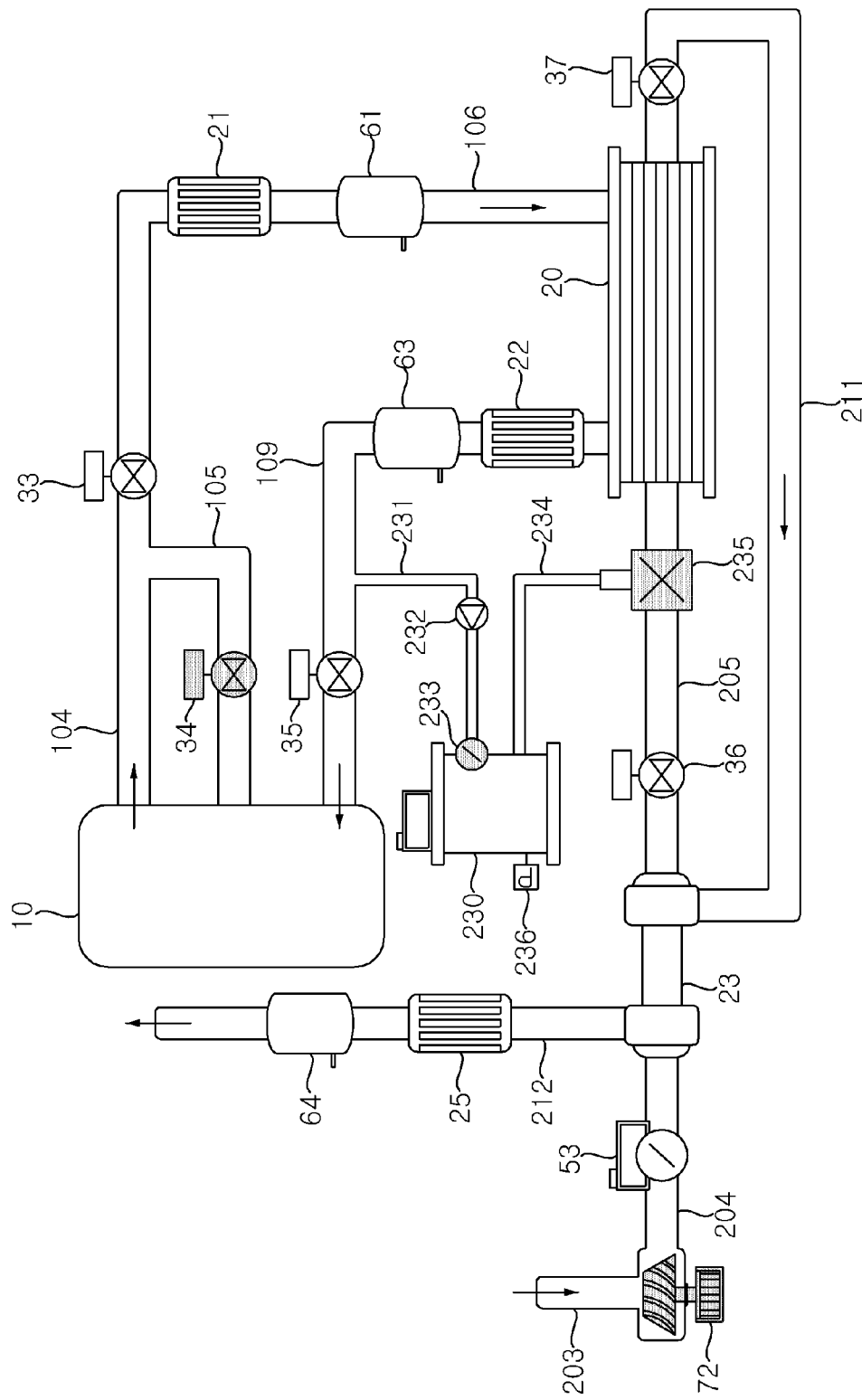

FIG. 7 is a flowchart of a method for controlling a power generation operation. FIGS. 8A and 8B are diagrams for explaining a power generation operation during a power generation operation. Specifically, FIG. 8A is an operation diagram of a fuel cell system that stores anode-off gas AOG in a buffer tank during power generation operation, and FIG. 8B is an operation diagram of a fuel cell system after storage of the anode-off gas AOG in the buffer tank is completed during power generation operation.

Referring back to FIG. 4, the fuel cell system 1 may perform a power generation operation for generating electricity in a stack through a chemical reaction between reformed gas and air (S200). When the power generation operation is performed, the fuel cell system 1 may perform a step of storing the anode-off gas AOG discharged from the stack 20 in the buffer tank 230. Hereinafter, the power generation operation will be described with reference to FIGS. 7, 8A, and 8B.

Referring to FIGS. 7, 8A, and 8B, the fuel cell system 1 may close the gas mixer 235 (S210). Therefore, it is possible to block the supply of the anode-off gas AOG stored in the buffer tank 230 to the gas mixer 235 during the power generation operation.

After S210, the fuel cell system 1 may adjust the rotation speed or otherwise adjust an output air flow volume or intensity of the second blower 72 according to the target power generation amount (S220). At this time, the stack side air supply valve 36 may be opened, and accordingly, external air may be supplied to the stack 20 via the humidifier 23 and the gas mixer 235.

Meanwhile, the fuel cell system 1 may adjust the reformer 140 of the fuel processing device 10 according to the target power generation amount (S220). At this time, the fuel cell system 1 may open the reformed gas valve 33 and close the bypass valve 34 to supply the reformed gas discharged from the fuel processing device 10 to the stack 20. In addition, the fuel cell system 1 may open the AOG valve 35 to supply a portion of the anode-off gas AOG discharged from the stack 20 back to the fuel processing device 10.

After S220, the fuel cell system 1 may open the buffer tank valve 233 (S230). After S230, the fuel cell system 1 may drive the buffer tank compressor 232 (S240). Accordingly, the remainder of the anode-off gas AOG discharged from the stack 20 may be compressed according to the operation of the buffer tank compressor 232 and supplied to the buffer tank 230.

After S240, the fuel cell system 1 may detect the pressure P_bt of the anode-off gas AOG stored in the buffer tank 230 through the pressure sensor 236 disposed in the buffer tank 230 (S250).

After S250, the fuel cell system 1 may determine whether the storage of the anode-off gas AOG in the buffer tank 230 is completed (S260). For example, the fuel cell system 1 may determine whether the pressure P_bt of the buffer tank 230 detected through the pressure sensor 236 at operation S250 is equal to or greater than a first set pressure Pa. Here, the first set pressure Pa may be a pressure value of the anode-off gas AOG corresponding to 100% of a total storage amount of the anode-off gas AOG that can be stored in the buffer tank 230, and having P_bt of the buffer tank 230 being equal to or greater than the first set pressure Pa may mean that the storage of the anode-off gas AOG in the buffer tank 230 is completed.

When the pressure P_bt of the buffer tank 230 is lower than the first set pressure P_a (No at S260), the fuel cell system 1 may determine that the storage of the anode-off gas AOG in the buffer tank 230 is not completed and returns to operation S250, continuously detect the pressure P_bt of the buffer tank 230 until the storage of the anode-off gas AOG in the buffer tank 230 is completed, and at the same time, may compare the pressure P_bt of the buffer tank 230 with the first set pressure P_a.

When the pressure P_bt of the buffer tank 230 is equal to or greater than the first set pressure (Yes at S260), the fuel cell system 1 may close the buffer tank valve 233 (S270). After S270, the fuel cell system 1 may stop the buffer tank compressor 232 (S280). Accordingly, the fuel cell system 1 may block the anode-off gas AOG discharged from the stack 20 from flowing into the buffer tank 230, and may supply the anode-off gas AOG discharged from the stack 20 to the fuel processing device 10.

Figure 9:
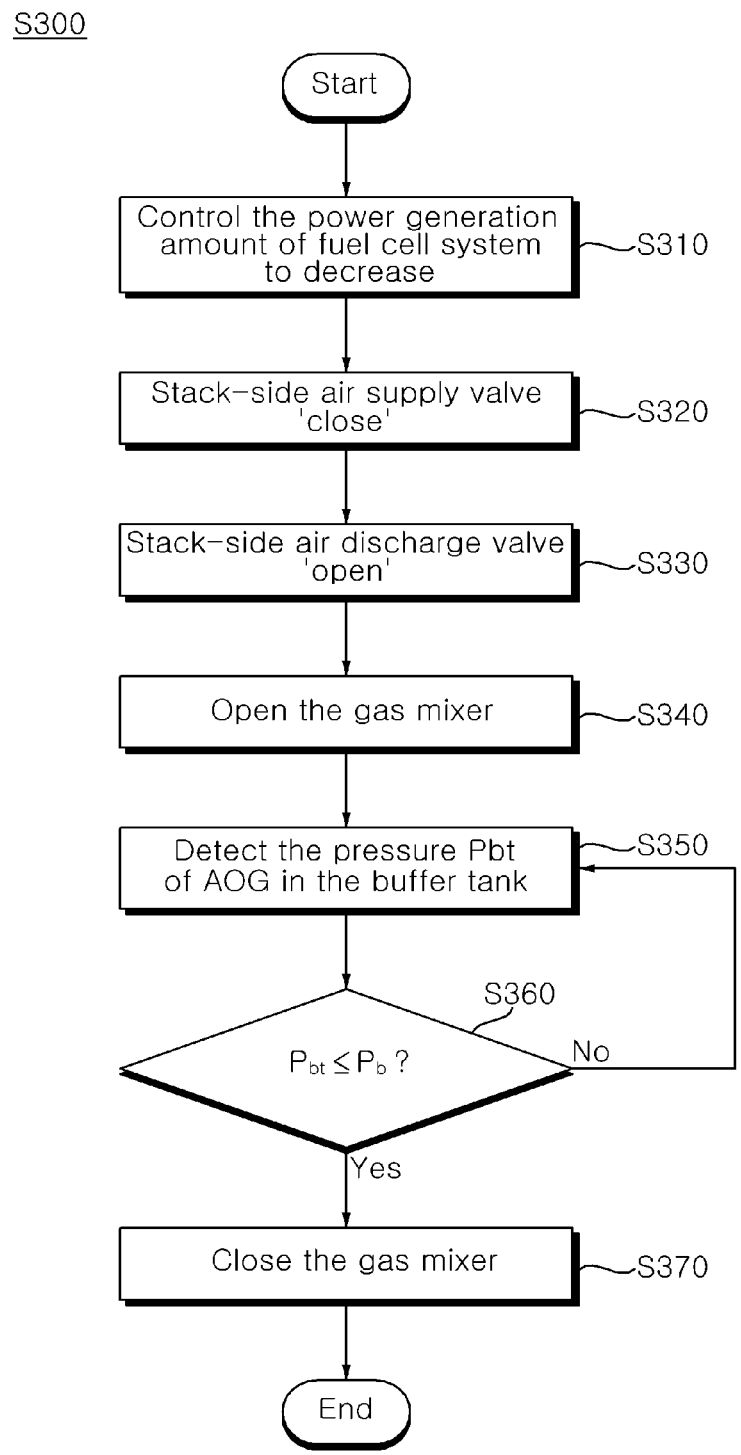
FIG. 9 is a flowchart of a method for controlling a stop operation according to an embodiment of the present disclosure.
Figure 10A:
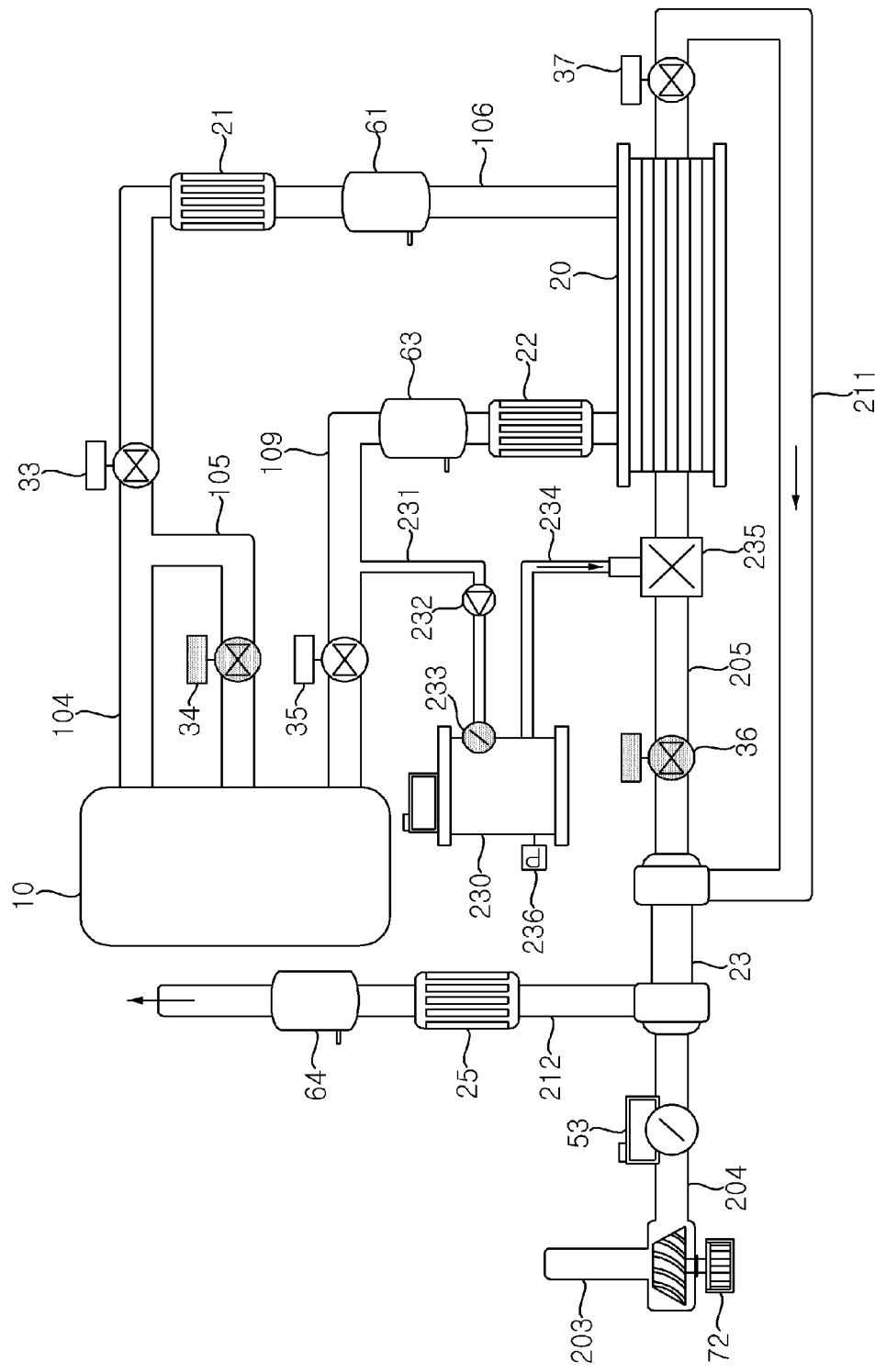
FIGS. 10A and 10B are diagrams for explaining a stop operation according to an embodiment of the present disclosure.
Figure 10B:
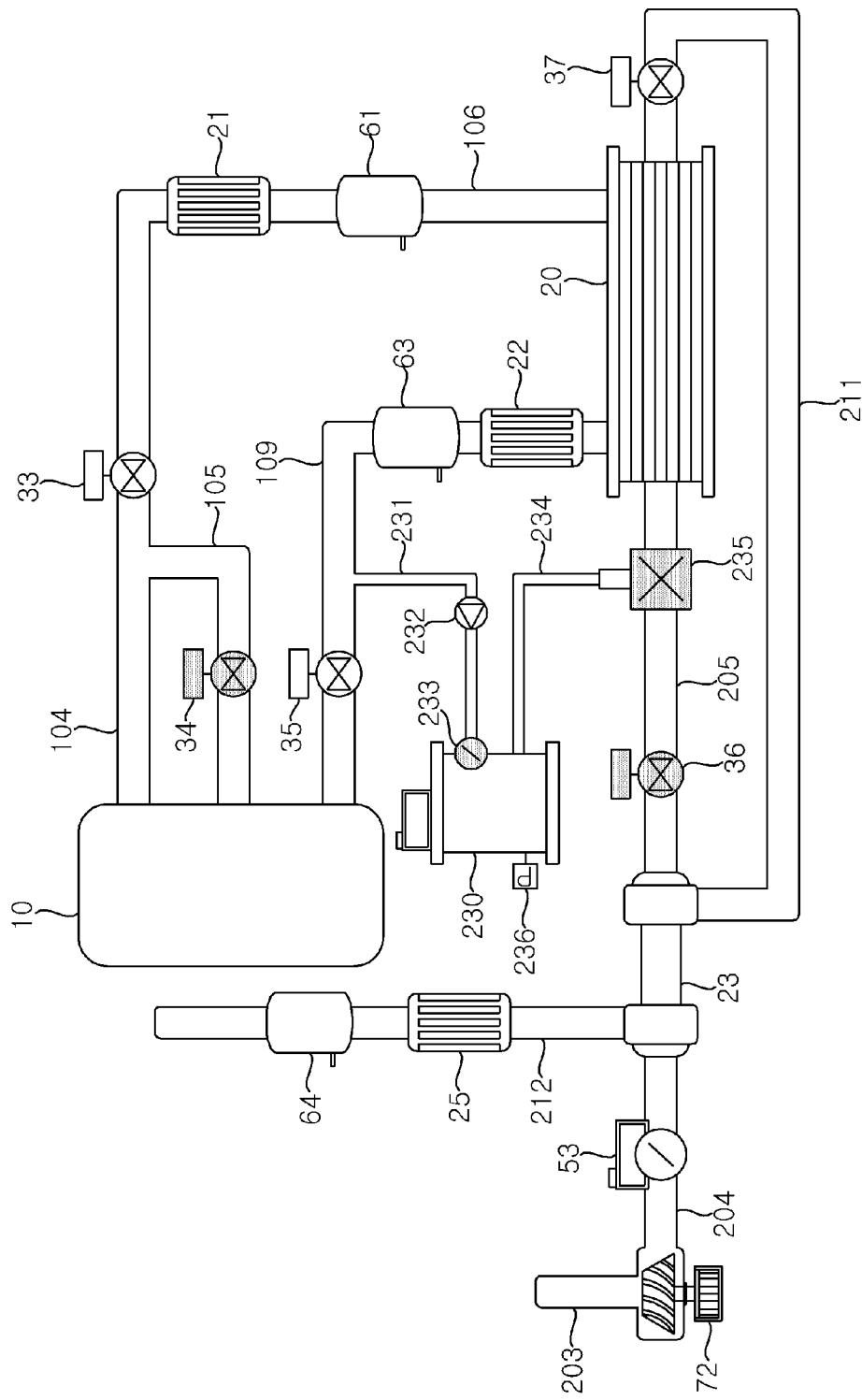

FIG. 9 is a flowchart of a method for controlling a stop operation. FIGS. 10A and 10B are operation diagrams of a fuel cell system during a stop operation (purge operation). Specifically, FIG. 10A is an operation diagram of the fuel cell system during a stop operation, and FIG. 10B is an operation diagram of the fuel cell system after the stop operation is completed.

Referring back to FIG. 4, the fuel cell system 1 may perform a stop operation (purge operation) of terminating the power generation of the stack 20 and removing oxygen remaining in the stack 20 (S300). When the power generation operation of the fuel cell system is terminated, a cathode electrode part may be oxidized by oxygen that remains after a chemical reaction in the stack 20, thereby reducing the lifespan of the stack 20. Accordingly, a stop operation (purge operation) of removing oxygen remaining in the stack after the power generation operation of the fuel cell system 1 is terminated may be implemented. Hereinafter, a stop operation (purge operation) will be described with reference to FIGS. 9, 10A and 10B.

Referring back to FIGS. 9, 10A, and 10B, when the power generation operation is terminated by a user or the power generation operation is terminated due to an error in a system, the fuel cell system 1 may perform a post-heat operation so that the amount of power generation in the stack is gradually decreased (S310). Here, the post-heat operation may refer to an operation in which the operation is stopped by gradually reducing the output in order to prevent reliability problems according to a temperature of the reformer and a sudden output change in the stack. For example, the fuel cell system 1 may gradually reduce the flow rates of air and reformed gas supplied to the stack 20 by adjusting the second blower 72 and the fuel processing device 10.

After S310, the fuel cell system 1 may close the stack-side air supply valve 36 (S320). Accordingly, the fuel cell system 1 may block the air supplied to the stack 20.

After S320, the fuel cell system 1 may open the stack-side air discharge valve 37 (S330). After S330, the fuel cell system 1 may open the gas mixer 235 (S340). At this time, the fuel cell system 1 may supply the anode-off gas AOG stored in the buffer tank 230 to the gas mixer 235 by closing the buffer tank valve 233. Accordingly, the anode-off gas AOG supplied to the gas mixer 235 may be supplied to the stack 20, thereby discharging oxygen remaining in the cathode electrode part to the outside of the stack. Accordingly, after the termination of the power generation operation, oxygen remaining in the cathode electrode part is removed, thereby preventing oxidation of the cathode electrode part.

After S340, the fuel cell system 1 may detect the pressure P_bt of the anode-off gas AOG stored in the buffer tank 230 through the pressure sensor 236 disposed in the buffer tank 230 (S250).

After S350, the fuel cell system 250 may determine whether the oxygen remaining in the stack is removed (S360). For example, the fuel cell system 1 may determine whether the pressure P_bt of the buffer tank 230 detected through the pressure sensor 236 at operation S350 is equal to or greater than a second set pressure Pb. Here, the second set pressure Pa may mean a pressure value of the anode-off gas AOG corresponding to 50% of the total storage amount of the anode-off gas AOG that can be stored in the buffer tank 230.

When the pressure P_bt of the buffer tank 230 is higher than the second set pressure P_b (No at S360), the fuel cell system 1 may determine that the removal of oxygen remaining in the stack 20 is not completed and returns to operation S350, continuously detect the pressure P_bt of the buffer tank 230 until the removal of oxygen remaining in the stack 20 is completed, and at the same time, may compare the pressure P_bt of the buffer tank 230 with the second set pressure P_b.

When the pressure P_bt of the buffer tank 230 is equal to or lower than the first set pressure (Yes at S360), the fuel cell system 1 may close the gas mixer 235 (S370). Accordingly, the supply of the anode-off gas AOG stored in the buffer tank 230 to the gas mixer 235 may be blocked.

According to various embodiments of the present disclosure, a purge operation of supplying the anode-off gas stored in the buffer tank to the stack is performed after the end of the power generation operation to remove oxygen remaining in the stack, thereby preventing a decrease in stack lifespan due to oxidation of the cathode electrode part. In addition, according to various embodiments of the present disclosure, as the service life of the stack increases due to the purge operation, system maintenance costs are reduced, thereby securing economic feasibility. In addition, according to various embodiments of the present disclosure, as the anode-off gas stored in the buffer tank is supplied to the stack when the power generation operation is initially entered, the stack is quickly preheated to improve power generation efficiency.

An aspect of the present disclosure is to solve the above and the other problems. Another aspect may be to provide a fuel cell system that performs a purge operation to remove oxygen remaining in a cathode electrode part in a stack after a power generation operation is terminated. Another aspect may be to provide a fuel cell system that performs a stack preheating operation of preheating a stack in a power generation operation. Another aspect may be to provide a fuel cell system that can reduce maintenance costs of the fuel cell system. Aspects of the present disclosure should not be limited to the aforementioned aspects, and other unmentioned aspects will be clearly understood by those skilled in the art from the following description.

According to an aspect of the present disclosure for achieving the above objects, a fuel cell system includes: a stack generating electric power by using reformed gas; a fuel processing device supplying reformed gas to the stack; a first gas passage connecting the stack and the fuel processing device, and flowing the reformed gas discharged from the fuel processing device; a second gas passage connecting the stack and the fuel processing device, and flowing an anode off gas (AOG) discharged from the stack; a buffer tank storing a portion of the anode off gas discharged from the stack; a first buffer tank passage connecting the buffer tank and the second gas passage; a second buffer tank passage flowing the anode off gas stored in the buffer tank; a gas mixer connected to the second buffer tank passage, and supplying the anode off gas stored in the buffer tank to the stack; and a controller controlling the gas mixer to supply the anode off gas stored in the buffer tank to the stack so as to preheat the stack or remove air remaining in the stack.

The fuel cell system further includes a buffer tank valve disposed on the first buffer tank passage, and controlling a flow of the anode off gas supplied to the buffer tank; and a buffer tank compressor located on a front end of the buffer tank valve, and compressing the anode off gas supplied to the buffer tank, wherein, during power generation operation, the controller closes the gas mixer, opens the buffer tank valve, operates the buffer tank compressor, and pressurizes a portion of the anode off gas discharged from the stack and then stores in the buffer tank.

The fuel cell system further includes a pressure sensor disposed on the buffer tank, and measures a pressure of the anode off gas stored in the buffer tank, wherein, when the pressure of the anode off gas stored in the buffer tank measured by the pressure sensor is equal to or greater than a first set pressure, the controller closes the buffer tank valve and stops the buffer tank compressor.

The fuel cell system further includes a blower supplying air to the stack; and an air supply valve disposed between the stack and the blower, and adjusting the air supplied from the blower to the stack, wherein, during a purge operation, the controller supplies the anode off gas stored in the buffer tank to the stack by closing the air supply valve and opening the gas mixer.

The fuel cell system further includes a pressure sensor disposed on the buffer tank, and measures a pressure of the anode off gas stored in the buffer tank, wherein, when the pressure of the anode off gas in the buffer tank measured by the pressure sensor is equal to or less than a second set pressure, the controller closes the gas mixer to terminate the purge operation.

The fuel cell system further includes a blower supplying air to the stack; and an air supply valve disposed between the stack and the blower, and adjusting the air supplied from the blower to the stack, wherein, during a stack preheating operation, the controller opens the gas mixer and the air supply valve so that air and anode off gas are mixed and then supplied to the stack, and operates the blower.

The fuel cell system further includes a first gas valve disposed on the first gas passage, and controlling flow of the reformed gas supplied to the stack; a bypass passage connecting the first gas passage and the fuel processing device; and a bypass valve disposed on the bypass passage, and controlling the flow of the reformed gas in the bypass passage, wherein, during the stack preheating operation, the controller closes the first gas valve and opens the bypass valve so that the reformed gas discharged from the fuel processing device flows back into the fuel processing device.

Meanwhile, in accordance with another aspect of the present disclosure, a method of controlling a fuel cell system includes: performing a power generation operation of storing the anode off gas discharged from the stack in the buffer tank by controlling a buffer tank valve for controlling flow of the anode off gas supplied to the buffer tank, and a buffer tank compressor for compressing the anode off gas.

The performing a power generation operation includes: pressurizing a portion of the anode off gas discharged from the stack and then storing in the buffer tank, by closing the gas mixer, opening the buffer tank valve, and operating the buffer tank compressor.

The pressurizing a portion of the anode off gas discharged from the stack and then storing in the buffer tank includes: closing the buffer tank valve and stopping the buffer tank compressor, when a pressure measured through a pressure sensor measuring a pressure of the anode off gas stored in the buffer tank is equal to or greater than a first set pressure.

Meanwhile, in accordance with another aspect of the present disclosure, a method of controlling a fuel cell system further includes: performing a purge operation of removing the air remaining in the stack, by adjusting an air supply valve for controlling flow of air toward the stack, and the gas mixer.

The performing a purge operation includes supplying the anode off gas stored in the buffer tank to the stack, by closing the air supply valve and opening the gas mixer. The performing a purge operation includes terminating the purge operation by closing the gas mixer, when a pressure measured through a pressure sensor measuring a pressure of the anode off gas stored in the buffer tank is equal to or less than a second set pressure.

Meanwhile, in accordance with another aspect of the present disclosure, a method of controlling a fuel cell system further includes: performing a stack preheating operation for preheating the stack, by adjusting an air supply valve for controlling flow of air toward the stack, the gas mixer, and the blower. The performing a stack preheating operation includes: mixing air and anode-off gas in the gas mixer, and then supplying to the stack, by opening the gas mixer and the air supply valve, and operating the blower.

The accompanying drawings are only for easy understanding of the embodiments disclosed in the present specification, and the technical concept disclosed in the present specification is not limited by the accompanying drawings, and it should be understood that all modifications, equivalents, and substitutes included in the concept and technical scope of the present invention are included in the accompanying drawings.

Similarly, although operations are depicted in the drawings in a particular order, it should not be construed that such acts must be performed in that particular order or sequential order shown, or that all depicted operations must be performed in order to achieve desirable results. In certain cases, multitasking and parallel processing may be advantageous.

In addition, although preferred embodiments of the present invention have been illustrated and described above, the present invention is not limited to the specific embodiments described above, and it is obvious that various modifications are possible by a person of ordinary skill in the art to which the present disclosure belongs without departing from the gist of the present disclosure as claimed in the claims, and these modifications should not be individually understood from the technical concept or perspective of the present invention.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fuel cell system comprising:
   a stack that generates electric power using reformed gas;
   a fuel processing device that supplies the reformed gas to the stack;
   a first gas passage that connects the stack and the fuel processing device, the first gas passage carrying the reformed gas discharged from the fuel processing device toward the stack;
   a second gas passage that connects the stack and the fuel processing device, the second gas passage carrying an anode-off gas (AOG) discharged from the stack toward the fuel processing device;
   a buffer tank that stores at least a portion of the AOG discharged from the stack;
   a first buffer tank passage that connects the buffer tank and the second gas passage;
   a second buffer tank passage that is coupled to the buffer tank;
   a gas mixer that is connected to the second buffer tank passage and supplies the AOG stored in the buffer tank to the stack; and
   a controller that controls the gas mixer to supply the AOG stored in the buffer tank to the stack so as to at least one of preheat the stack or remove air remaining in the stack.

2. The fuel cell system of claim 1, further comprising:
   a buffer tank valve provided on the first buffer tank passage, the buffer tank valve controlling a flow of the AOG supplied to the buffer tank; and
   a buffer tank compressor located on a front end of the buffer tank valve, buffer tank compressor compressing the AOG supplied to the buffer tank, wherein, during a power generation operation, the controller closes the gas mixer, opens the buffer tank valve, operates the buffer tank compressor such that a portion of the AOG discharged from the stack is pressurized and stored in the buffer tank.

3. The fuel cell system of claim 2, further comprising a pressure sensor provided on the buffer tank, the pressure sensor measuring a pressure of the AOG stored in the buffer tank,
wherein, when the pressure of the AOG stored in the buffer tank measured by the pressure sensor is equal to or greater than a first set pressure, the controller closes the buffer tank valve and deactivates the buffer tank compressor.

4. The fuel cell system of claim 1, further comprising:
a blower that supplies air to the stack; and
an air supply valve provided between the stack and the blower, the air supply valve adjusting a flow of the air supplied from the blower to the stack,
wherein, during a purge operation, the controller closes the air supply valve and opens the gas mixer so that the AOG stored in the buffer tank is supplied to the stack.

5. The fuel cell system of claim 4, further comprising a pressure sensor provided on the buffer tank, the pressure sensor measuring a pressure of the AOG stored in the buffer tank,
wherein, when the pressure of the AOG in the buffer tank measured by the pressure sensor is equal to or less than a second set pressure, the controller closes the gas mixer to terminate the purge operation.

6. The fuel cell system of claim 1, further comprising:
a blower that supplies air to the stack; and
an air supply valve provided between the stack and the blower, the air supply valve adjusting a flow of the air supplied from the blower to the stack,
wherein, during a stack preheating operation, the controller opens the gas mixer and the air supply valve and operates the blower so that air and AOG are mixed and then supplied to the stack.

7. The fuel cell system of claim 6, further comprising:
a first gas valve provided on the first gas passage, and controlling a flow of the reformed gas supplied to the stack;
a bypass passage that connects the first gas passage and the fuel processing device; and
a bypass valve provided on the bypass passage, the bypass valve controlling the flow of the reformed gas in the bypass passage,
wherein, during the stack preheating operation, the controller closes the first gas valve and opens the bypass valve so that the reformed gas discharged from the fuel processing device flows back into the fuel processing device.

* * * * *